United States Patent [19]

Erickson et al.

[11] Patent Number: 4,609,359

[45] Date of Patent: Sep. 2, 1986

[54] EDUCATIONAL GAME

[76] Inventors: Alan N. Erickson, P.O. Box 503, Cardiff by the Sea, Calif. 92007; Steve E. Erickson, 5683 Easton Ave., San Diego, Calif. 92120

[21] Appl. No.: 776,127

[22] Filed: Sep. 13, 1985

[51] Int. Cl.⁴ ............................................... G09B 7/10
[52] U.S. Cl. .................................... 434/338; 273/237; 434/153
[58] Field of Search ....................... 434/338, 130, 153; 273/302, 237

[56] References Cited

U.S. PATENT DOCUMENTS

| | | | |
|---|---|---|---|
| 183,335 | 10/1876 | Sitterley | 273/302 |
| 1,745,946 | 2/1930 | Murray | 434/130 X |
| 1,932,909 | 7/1932 | Pollard et al. | 434/153 |
| 2,139,860 | 4/1937 | Schwendeman | 434/338 X |
| 3,100,352 | 8/1963 | Boissevain | 434/338 |
| 3,650,044 | 3/1972 | Burdick | 434/338 |
| 3,736,671 | 6/1973 | Oleinick | 434/338 |
| 3,809,784 | 5/1974 | Munafo | 434/335 |
| 4,449,941 | 5/1984 | McGuire et al. | 434/153 |

FOREIGN PATENT DOCUMENTS 284447 11/1952 Switzerland ..................... 434/338

Primary Examiner—William H. Grieb
Attorney, Agent, or Firm—Thomas J. Tighe

[57] ABSTRACT

An educational game for developing recognition skills regarding items of significance on a map, the map being any generally two dimensional depiction of a system (e.g. geological, astronomical, etc.). A map has a selecting electrode and a plurality of selectable electrodes, each selectable electrode being associated with one and only one item of significance on the map. A player draws a card from a deck of cards. The card bears a code and the name of an item of significance on the map. The code refers to a setting for a multiple pole, single throw switch. The switch is adapted to bring the selectable electrodes individually into an energizing circuit. The player sets the switch according to the code and then attempts to locate the named item of significance by contacting the selecting electrode with the selectable electrode associated with said item. If the player's choice is correct an indicator is energized. Optionally, a push button switch must be depressed before the indicator is energized. Examples of maps are disclosed as being a map of the United States and a map of the heavens as seen from the earth.

15 Claims, 4 Drawing Figures

EDUCATIONAL GAME

BACKGROUND OF THE INVENTION

This invention relates in general to educational devices and apparatuses which involve the contacting of one electrode to a single choice of a plurality of second electrodes by a player, the lighting or non-lighting of an indicator being the means by which the player discovers whether he or she has chosen correctly or incorrectly. In particular, it relates to such devices in which there is a map (as herein defined) and a correspondence between points, formations and/or areas on the map and a matrix of second electrodes.

This invention presents a device with the advantages of being both recreational and educational. It can be used simply as an enjoyable game or it can be used as a teaching aid, or both. In one embodiment, it can be used to advantage to teach a child the geography of the world or portion thereof. In a second embodiment it can be used to advantage to teach a child astronomical formations of the stars. In fact, there are an unlimited number of embodiments, each of which can be used to advantage to teach a person the relative location of points or areas of interest on a "map" as hereinafter defined.

Other advantages and attributes of this invention will be readily discernible upon a reading of the text hereinafter.

SUMMARY OF THE INVENTION

This invention presents a map which for purposes of this specification and the following claims is defined as any generally two dimensional depiction of a system (e.g. geological, astronomical, anatomical, botanical, mechanical, electrical, or the like) which contains points, formations and/or areas of significance, and concerning which it is of some value to be cognizant of the relative locations of said points, formations and areas or to recognize them. For further example, a map as defined herein can be a two dimensional layout of a geographical area, a diagram or chart of star formations, a diagram depicting anatomical features of a human body, and the like. The points, formations, areas, and other things of significance on a map shall hereinafter be referred to as "items of significance." The items of significance have one-to-one correspondence with a set of selectable electrodes. A multiple pole, single throw switching means is used to bring the selectable electrodes individually into a circuit with an indicator and an energizing means. During the course of play each player in turn, picks a card from a set of playing cards. Each card indicates a setting for the switching means for bringing a selectable electrode into circuit, and each card bears a name of an item of significance associated with the electrode. After taking a card, a player sets the switching means in the position indicated on the card and takes a selecting electrode and attempts to choose and contact the correct selectable electrode associated with the name on the card. If the player contacts the correct electrode then the energizing means lights the indicator. The lighting of the indicator informs the player that he has chosen correctly. If the selecting electrode contacts a selectable electrode out of circuit then the indicator will not be energized.

An object of this invention is to present a simple and fun game whereby a player can learn the relative positions and locations of items of significance on a map.

A further object of this invention is to present a simple and fun game whereby a player can learn to recognize items of significance on a map.

Other of objects of this invention will be readily discernible upon a reading of the text hereinafter.

DESCRIPTION OF THE PREFERRED EMBODIMENT

Figure 1:
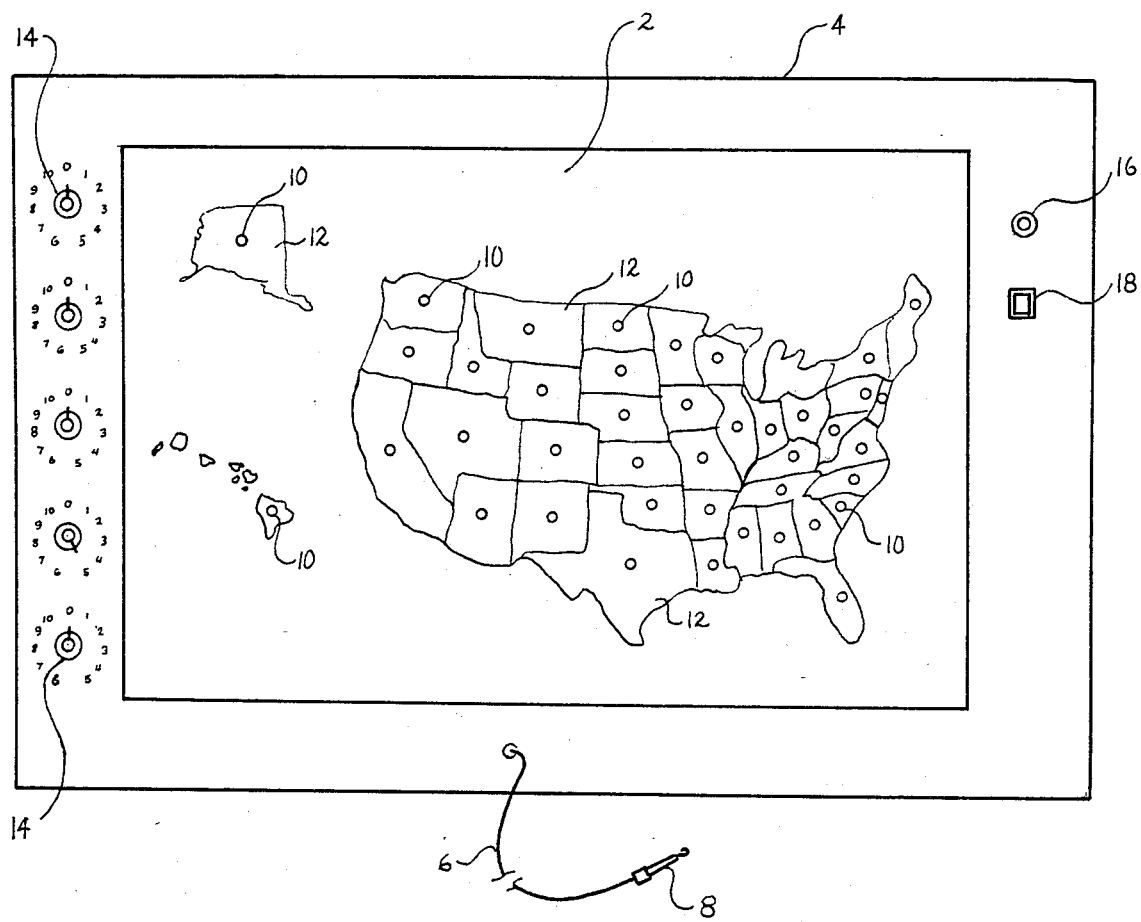
FIG. 1 is a planar view of the device in a first embodiment.

Referring to FIG. 1, a map 2 is shown depicting the United States of America. The map 2 is shown to be part of an integrated playing device 4. Extending from the playing device 4 on a cord 6 is a first electrode 8 which is also referred to as a "selecting electrode." The map is divided into significant areas which can be seen to be states. Disposed on the map and projecting therefrom are a plurality of second electrodes 10 also referred to as "selectable electrodes." As can be seen there is a one-to one correspondence between the second electrodes 10 and the significant areas 12. The second electrodes 10 are individually brought into a circuit by a switching means shown here as a plurality of rotary switches 14. Each rotary switch has eleven poles and a single wiper. An indicator 16 is energized each time the selecting electrode 8 comes in contact with a selectable electrode 10 which has been brought into the circuit by a setting of the switches 14. Optionally, the selecting electrode is in the form of a clasping hook adapted to embrace a neck of each selectable electrode, and the indicator does not energize until a button 18 is pushed.

Figure 4:
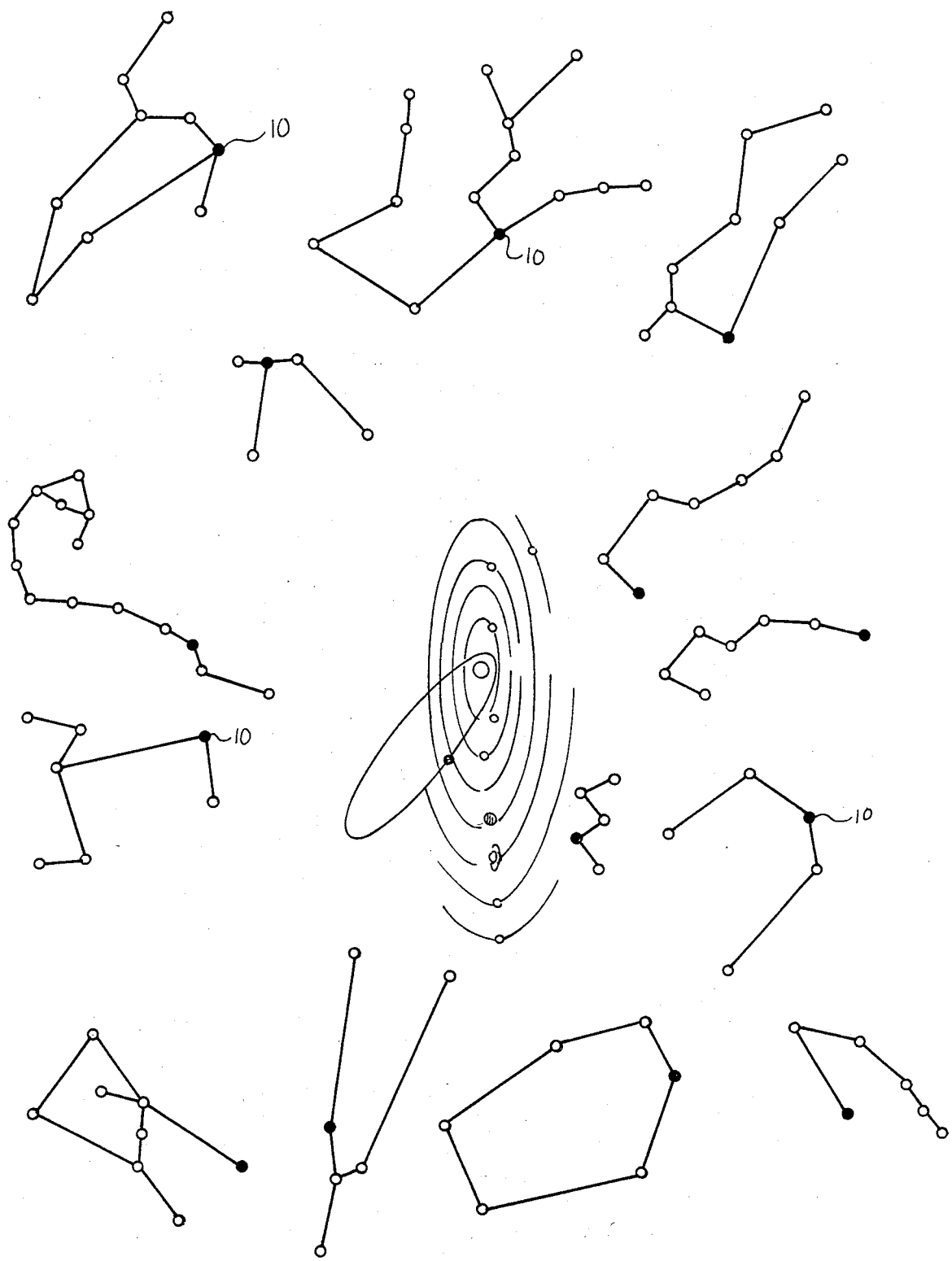
FIG. 4 is a planar view of an alternate map.

Referring to FIG. 4 a second map is shown. This is a map of stras and our planetary system. The stars are shown to be in their astrological forms. Associated with each star formation is a second electrode 10. Also, each planet in the solar system and Haley's comet each are associated with a second electrode 10. This embodiment teaches a player to recognize star formations and the relative locatons of planets and Haley's comet in our solar system.

Figure 3:
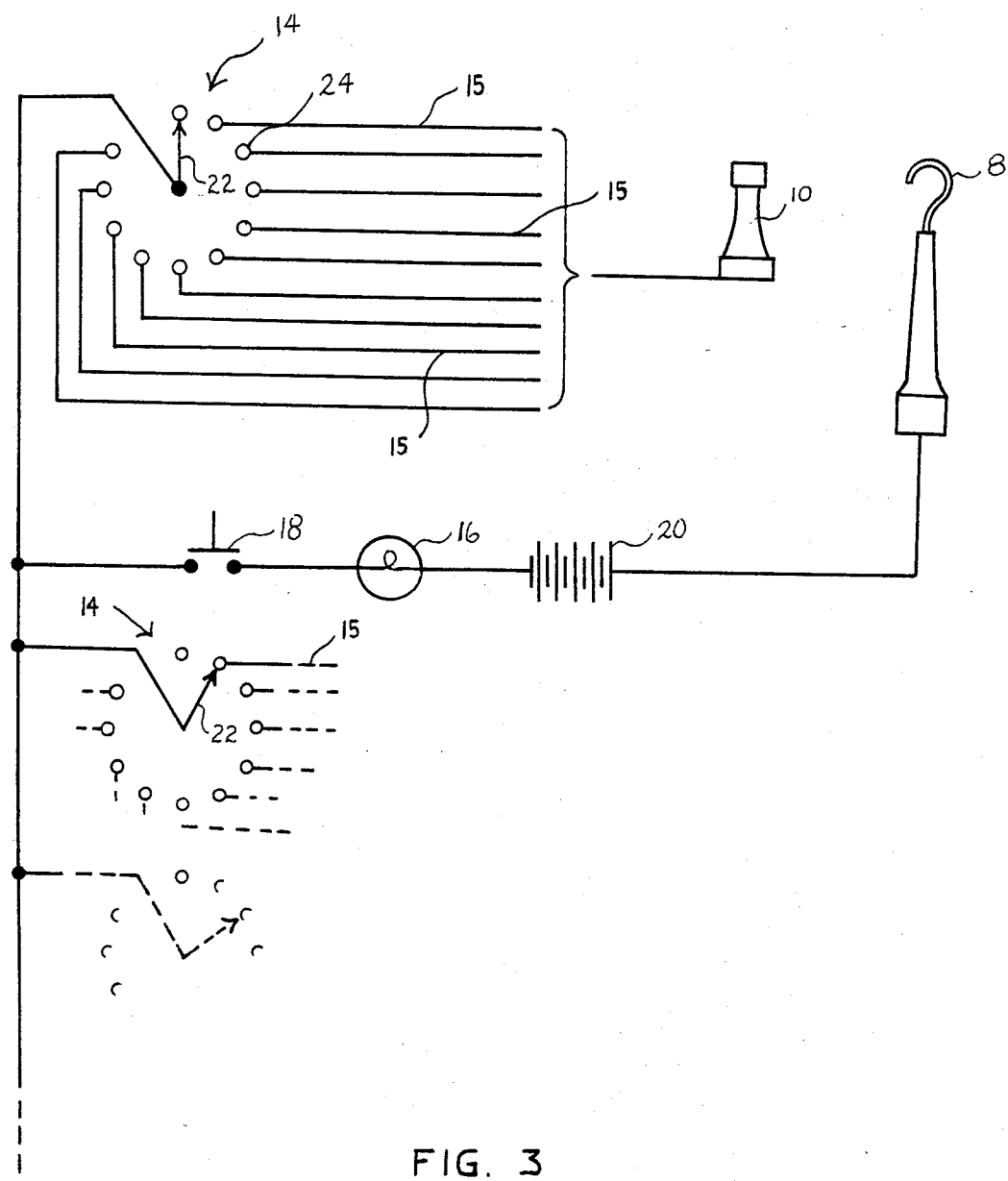
FIG. 3 is a schematical representattion of the electrical circuit of the device.

Referring to FIG. 3, an energizing means 20 in the form of a multiple cell battery is seen to be in series connection with the selecting electrode 8, the indicator 16, and a single pole, single throw push button switch 18. Each rotary switch 14 is seen to comprise a single wiper 22 and eleven poles 24. The dashed lines of FIG. 3 indicate that the remaining three switches are schematically the same as the uppermost switch shown in solid lines. Each wiper 22 is in parallel electrical communication with the wipers of the other switches 14. The circuit is so adapted that when the push button 18 is depressed, an energy path is made from the energizing means 20 through the indicator 16 and the push button 18 to the wipers 22 of all of the switches 14. The energy will flow in a closed loop and energize the indicator only if at least one of the wipers 22 is in electrical communication with a selectable electrode 10 which is in electrical contact with the selecting electrode 8. The bracket in FIG. 3 indicates that each pole is electrically connected to its own and separate selectable electrode 10 via circuit lines 15.

Referring again to FIG. 3, there is a one-to-one correspondence between each pole of the switches and the second electrodes 10. In other words, each second electrode 10 is in electrical communication with only one pole 24 of one switch 14. Each switch 14 has a pole which is not connected to a second electrode 10 nor to anything else. Preferably this pole is marked or considered the "zero" pole. In operation, a second electrode is individually brought into the circuit by having its associated pole in contact with the wiper 22 of a switch 14 and setting the wipers of all other switches to their zero positions. Although five of the selectable electrodes can actually be brought into the circuit in parallel, the rules of the game specify that only one of the rotary switches be in its non-zero position when the button switch is depressed. If not, the player loses a turn.

Figure 2:
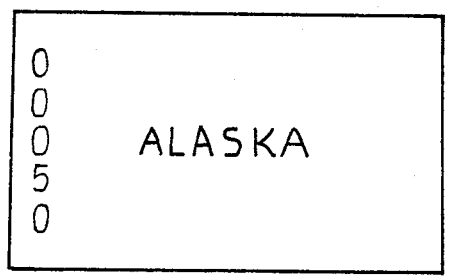
FIG. 2 is a planar view of a playing card.

Referring to FIG. 2, a playing card is shown bearing two types of information. The first type is a code indicating a setting for the five rotary switches 14. The second type of information is a name of a significant area on the map, in this case Alaska. The switch setting code for this embodiment will always comprise five digits, one digit for each rotary switch 14, and four of the five digits will always be zero and the fifth non-zero. This constraint on the codes insures that only one selectable electrode is brought into circuit when the switches are set according to a card.

It should be noted that the constraint on the codes is a characteristic of his embodiment and that there are other embodiments which are not so constrained. For example, the switching means could comprise a fifty pole, signal throw switch, rather than the five switches of ten active poles each, and the code any number from one to fifty (for the fifty states).

When playing the game, each player, in turn, draws a playing card as shown in FIG. 3. Each playing card is preferably different, that is, it has a different switching setting and name upon it. A player drawing the card as shown in FIG. 2 would then set the uppermost three switches to their zero settings, set the fourth switch to its number 5 setting, and set the bottom switch to its zero position. The circuit is such that when the switches are in the indicated switch setting, the second electrode associated with the state of Alaska is brought into the circuit.

After setting up the switches as indicated on the card, the player would then attempt to contact the first electrode 8 with the second electrode 10 associated with the state of Alaska. In other words, he would try to find the state of Alaska on the map and connect the selecting electrode with the Alaska selectable electrode. After connecting the selecting electrode 8 with his or her choice of second electrodes 10, the player would then push the button 18. If the indicator 16 lights then he or she has made a correct choice, if it does not light then the choice was incorrect. Any suitable scoring system can be used to record correct and incorrect choices and determine a winner.

It should be noted that the card could also have borne the name if the capital of Alaska or a significant city in Alaska. The switching setting would remain the same end, in such a case the player would be asked to pick the state in which the city was located. As can be seen, the concept can be extended considerably to any characteristics of the state one would wish to put on the card. Thus, a player can not only learn the location of the state but also the capital of the state, important city's of the state, and other notable attributes of the state.

Referring again to FIG. 4, there are only twenty-four selectable electrodes, and so the switching means need only have twenty-four active poles. The switching means, therefore, could be configured as three rotary switches with eight active poles and one zero pole each. The codes would then comprise three digits: two zero digits and one non-zero digit from one to eight. The switching means could also be a twenty-four pole, single throw rotary switch, or any other switching means with at least twenty-four effective poles.

The foregoing was given for illustrative purpose and no unnecessary limitations in the following claims should be drawn therefrom.

We claim:
1. An educational game comprising:
    (a) a selecting electrode,
    (b) an energizing means,
    (c) a plurality of selectable electrodes adapted to be individually contacted by the selecting electrode under control of a player, each selectable electrode being associated with only one item of significance on a map,
    (d) an indicator means adapted to be energized whenever the selecting electrode contacts a selectable electrode which is in an energizing circuit,
    (e) a multiple setting switching means adapted to bring the plurality of selectable electrodes individually into the energizing circuit, and
    (f) a set of playing card, each card bearing indicia indicating a setting for the switching means which brings a selectable electrode into the energizing circuit, and further indicating a name of the associated with said selectable electrode.
2. The game of claim 1 further comprising a single pole, single throw switch adapted to prevent the indicator from being energized unless said switch is actuated.
3. The game of claim 2 wherein the single pole, single throw switch is a spring biased push button switch.
4. The game of claim 1 wherein the multiple setting switching means comprises a multiple pole, single throw switch.
5. The game of claim 2 wherein the multiple setting switching means comprises a multiple pole, single throw switch.
6. The game of claim 1 wherein the multiple setting switching means comprises a plurality of multiple pole, single throw switches.
7. The game of claim 2 wherein the multiple setting switching means comprises a plurality of multiple pole, single throw switches.
8. The game of claim 1 wherein the map is a map of the United States of America.
9. The game of claim 2 wherein the map is a map of the United States of America.
10. The game of claim 4 wherein the map is a map of the United States of America.
11. The game of claim 6 wherein the map is a map of the United States of America.
12. The game of claim 1 wherein the map is a map of the heavens.
13. The game of claim 2 wherein the map is a map of the heavens.
14. The game of claim 4 wherein the map is a map of the heavens.
15. The game of claim 6 wherein the map is a map of the heavens.

* * * * *